United States Patent [19]
Chula

[11] Patent Number: 5,650,680
[45] Date of Patent: Jul. 22, 1997

[54] DYNAMO ELECTRIC MACHINE WITH PERMANENT MAGNET ROTOR STRUCTURE

[75] Inventor: Stanley S. Chula, Rothschild, Wis.

[73] Assignee: Marathon Electric Mfg. Co., Wausau, Wis.

[21] Appl. No.: 570,095

[22] Filed: Dec. 11, 1995

[51] Int. Cl.[6] .................................................. H02K 1/27
[52] U.S. Cl. ........................ 310/156; 310/190; 310/216; 310/261; 310/265; 310/111
[58] Field of Search ............................. 310/156, 190, 310/265, 192, 214, 216, 261

[56] References Cited

U.S. PATENT DOCUMENTS

| | | | |
|---|---|---|---|
| 2,193,675 | 3/1940 | Merrill | 310/156 |
| 2,626,367 | 1/1953 | Beymer | 310/156 |
| 3,840,763 | 10/1974 | Baumann et al. | |
| 4,025,840 | 5/1977 | Brissey et al. | |
| 4,207,483 | 6/1980 | Baer. | |
| 4,322,648 | 3/1982 | Ray et al. | |
| 4,327,302 | 4/1982 | Herschberger | 310/156 |
| 4,354,126 | 10/1982 | Yates | 310/156 |
| 4,434,546 | 3/1984 | Hershberger. | |
| 4,517,483 | 5/1985 | Hucker et al. | |
| 4,618,792 | 10/1986 | Yates. | |
| 4,850,100 | 7/1989 | Stokes. | |
| 4,906,882 | 3/1990 | Erndt et al. | |
| 4,980,592 | 12/1990 | Olmr et al. | |
| 5,030,871 | 7/1991 | Shah et al. | 310/261 |
| 5,040,286 | 8/1991 | Stark. | |
| 5,063,318 | 11/1991 | Anderson. | |
| 5,097,166 | 3/1992 | Mikulic. | |
| 5,200,662 | 4/1993 | Tagami et al. | |
| 5,218,251 | 6/1993 | Allwine, Jr. | |

*Primary Examiner*—Steven L. Stephan
*Assistant Examiner*—Burton S. Mullins
*Attorney, Agent, or Firm*—Andrus, Sceales, Starke & Sawall

[57] ABSTRACT

A permanent magnet generator includes an annular stator with windings on the inner face. A round rotor is rotatably mounted in the stator, and includes a plurality of circumferentially spaced rectangular openings inwardly of the outer peripheral portion of the core. Radial U-shaped grooves are formed between the openings. A magnetic unit, including a rectangular permanent magnet and an abutting magnetic conductive shim, is close-fitted within each opening. The core includes core lamination and separate end laminations of a structure corresponding to the core laminations. The end laminations are rotated about an axis through the core to offset the magnetic unit openings with respect to the magnetic unit opening of the core laminations. The laminations are riveted together, with the offset end lamination retaining the magnetic units within the core. The shims respond to the magnetic flux resulting from rotation of the rotor to generate eddy currents and a resulting magnetic flux which cancels harmonic components from the total magnetic flux through the stator and thereby minimizes zero crossings and distortion of the output voltage and current.

25 Claims, 4 Drawing Sheets

DYNAMO ELECTRIC MACHINE WITH PERMANENT MAGNET ROTOR STRUCTURE

BACKGROUND OF THE INVENTION

The present invention relates to dynamo electric machines, and in particular to a permanent magnet generator having a rotor including a plurality of permanent magnets generating an operative magnetic flux field.

Generally, permanent magnets generators and other like machines include an annular stator with inner winding slots containing an output winding. A capacitor may be connected in parallel with the output winding. A round circular rotor is rotatably mounted within the stator. A plurality of circumferentially distributed and permanently magnetized magnets are inserted within the outer peripheral portion of a magnetic rotor core. Generally, the core has a plurality of spaced holes or axially extended openings within which the permanent magnets are secured. The rotor structure is such that the rotor may operate at high rotational speeds, with the magnets located with regard to both the magnetic and structural limitations required for any particular design. Generally, the core structure of both the stator and the rotor are formed of a magnetic steel to form a complete interacting magnetic path for the flux created by the permanent magnets. Various patents disclose this basic structure. U.S. Pat. No. 4,517,483 which issued May 14, 1985 discloses a rather special permanent magnet structure with both circumferentially polarized magnets in one embodiment and radially polarized magnets in an alternate embodiment. Special ferrous magnetic core structures are incorporated into the rotor core structure for establishing highly saturable portions which limit the output voltage due to the saturation levels. U.S. Pat. No. 3,840,763 which issued Oct. 8, 1974 discloses a permanent magnet rotor with the magnets distributed throughout an annular core with a special distribution of the magnets creating a particular flux characteristic within the core structure without saturation thereof. U.S. Pat. No. 4,025,840 which issued May 24, 1977 discloses a permanent magnet generator with the stator specially modified with magnetic shims within the winding slots for controlling and adjusting the output power of one or more selected windings of a multiple winding, single phase permanent magnet generator.

For purposes of simplicity and conventional description, the permanent magnet generator is hereinafter referred to by the acronym PMG. The prior art has considered variations in the construction of PMG's and particular related to the arrangement of construction to control the output of the generator.

The present inventor has recognized a further problem associated with PMG's and in particular an undesirable waveshape of the voltage of the output winding. The inductance of the winding and the capacitance unit is parallel therewith creates a resonant circuit resulting in a substantial harmonic content within the fundamental output signal frequency. The result is a creation of multiple zero crossings within the fundamental frequency output which adversely affect the output current. There is a need for consideration and at least minimizing, if not eliminating, of the harmonic content to maintain and establish an optimal output voltage and current from the PMG.

SUMMARY OF THE PRESENT INVENTION

The present invention is particularly directed to a PMG having a conductive element in series with each of the magnetic fields of each of the distributed permanent magnets and within which magnetic conductive members eddy currents are generated to establish related fluxes interacting with the flux of the permanent magnets to minimize the harmonic content and provide a more optimal voltage output. Generally, in the preferred construction incorporating the present invention, the conductive member is incorporated directly into the rotor structure in close placement to the magnets. In a preferred construction, the conductive members immediately abut the face of the magnet and preferably the innermost face of the magnet.

The structural arrangement, of course, ensures the integrity of the rotor structure and support of the magnets and adjacent conductive members within the magnetic core structure under the required high speed operation of the rotor. In a practical and commercially preferred construction, the rotor is formed from a stack of like-laminations, with circumferential openings in the outer peripheral portion of the rotor core. The openings are generally rectangular openings and within the stacked lamination core provide correspondingly shaped and elongated magnet openings. The magnetic units include a permanent magnet in combination with an abutting conductive shim. The magnetic units are close fitted within each opening with end laminations secured as a part of the stacked core to lock the magnetic units within the core.

In a preferred construction, the core is coupled to the shaft through a suitable interlocking mechanism, such as a keyway coupling. The imbedded magnets are offset with respect to the shaft coupling. The end lamination may then be a magnetic core lamination which is rotated through 180° to offset the openings with respect to the core openings in the laminations having the magnetic units. The stack is then riveted together with the end laminations securing the magnets within the laminated core.

The outer periphery of the core, in accordance with the known construction, is preferably formed with air gaps located within the laminations to space the circumferentially spaced magnets from each other, and thus develop the radially directed flux through the air gap for coupling to the stator winding.

Although the shims are preferably placed beneath the magnets within each opening, the shims may be placed adjacent the outer face of the magnet. With the outer spacing, the eddy current related flux would tend to more fully retard the harmonic content. It would, however, also tend to retard the fundamental output voltage, and thus generally the inner placement is preferred.

The present invention thus provides a very simple, cost effective solution to the creating of an optimal output voltage signal with, at most, minimal harmonic content.

The features and other modifications which may be incorporated within the structure of the present invention will be readily realized from the following description of the illustrated embodiments.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DESCRIPTION OF THE ILLUSTRATED EMBODIMENT

Figure 1:
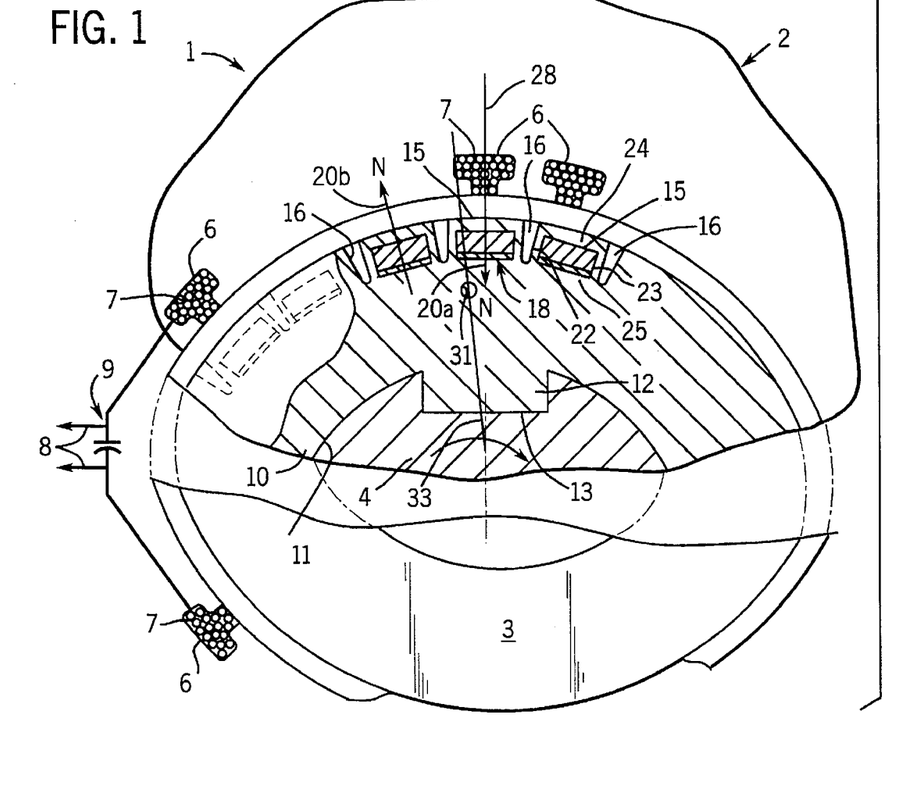
FIG. 1 is a diagrammatic illustration of a PMG with parts broken away.

Referring to the drawings, and particularly to FIG. 1, a diagrammatically illustrated permanent magnet generator, or PMG 1, includes an annular stator 2, and a round rotor 3. The stator 2 is mounted as a fixed member within a suitable housing, not shown, and the rotor 3 is rotatably mounted within the stator with a small air gap between the opposed surfaces in accordance with conventional design. The rotor 3 is coupled to and supported by a shaft 4 which is rotatably mounted within suitable bearings, not shown, in the housing, not shown.

The stator 2 is of a conventional construction and includes an elongated, laminated annular core 5, having a plurality of circumferentially distributed winding slots 6 on the inner peripheral surface thereof. A winding 7 is wound within the slots 6 and connected to a pair of output leads 8 to provide an appropriate alternating current and voltage output. A capacitor 9 is diagrammatically shown connected and parallel between the output leads 8 and thus in parallel with the winding 7.

The rotor 3 includes an annular laminated core 10 with a circular shaft opening 11 having a diameter corresponding to the diameter of the shaft 4. The core 10 and shaft 11 are connected by an illustrated keyway unit 12. The core 10 has an integral key 12 which mates with a notch or keyway 13 formed in the shaft 4. Any other connection can be filed.

Figure 2:
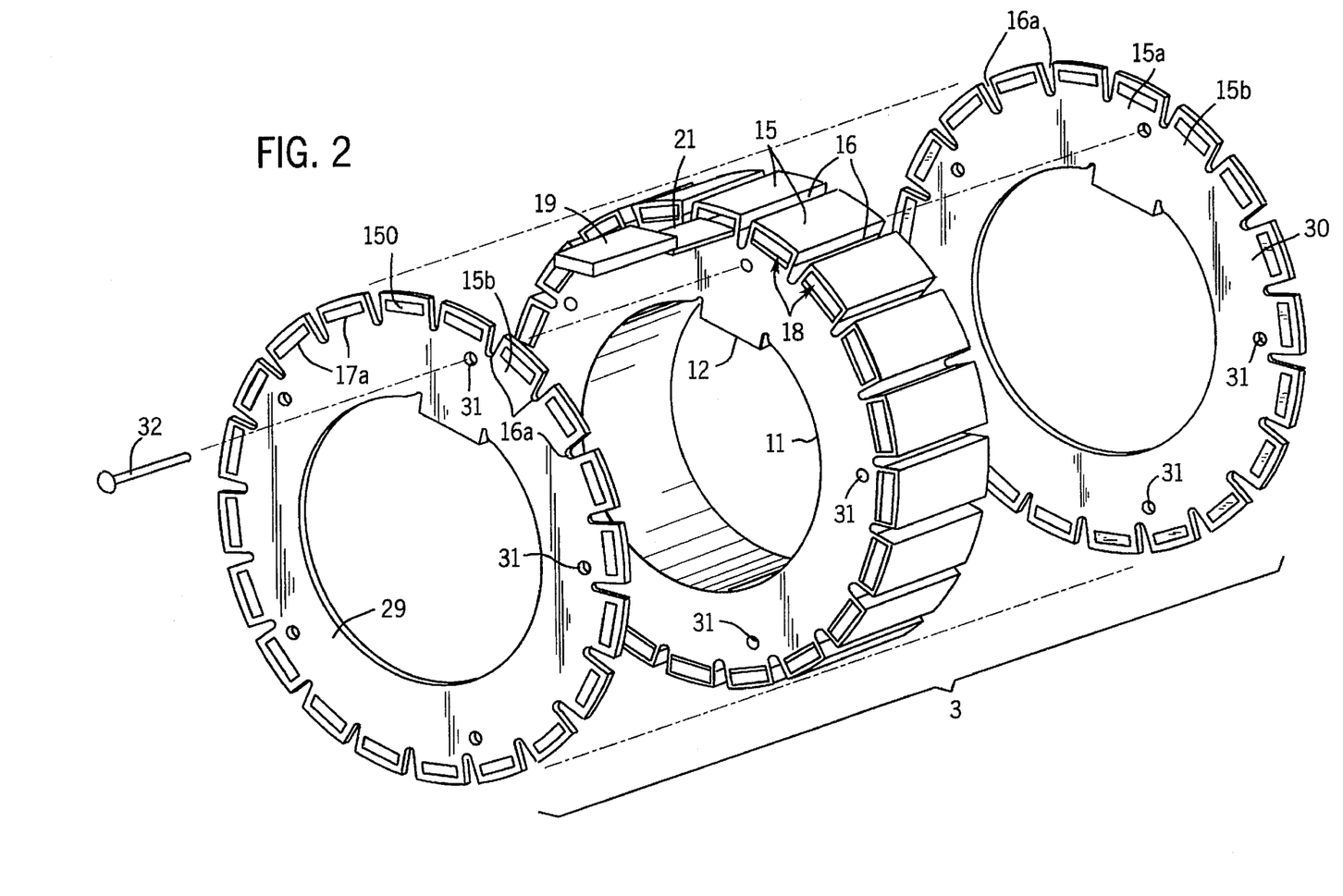
FIG. 2 is a pictorial exploded view of a rotor core illustrating an embodiment of the present invention.
Figures 3, 4:
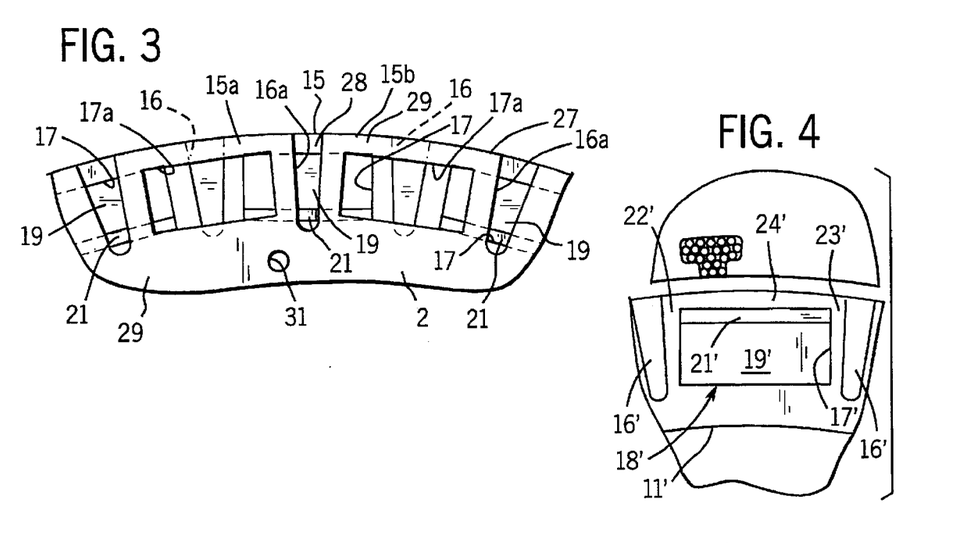
FIG. 3 is an enlarged fragmentary view of the rotor core structure shown in FIGS. 1 and 2.
FIG. 4 is a view similar to FIG. 3 illustrating an alternate embodiment of the present invention.

As most clearly shown in FIGS. 2 and 3, the rotor core 10 is formed with a plurality of peripheral teeth 15 are equicircumferentially distributed about the surface, and are separated from each other by relatively shallow, narrow, and generally U or V-shaped air gaps 16. Each illustrated tooth 15 includes a similar opening 17. The illustrated openings 17 are generally rectangular openings, and each receives a separate magnetic unit 18.

The illustrated magnetic unit 18 is basically a rectangular block-like member which forms a close fit within each of the openings. Each magnetic unit 18 includes a permanent magnet 19, which in the illustrated embodiment of the invention, is radially polarized as shown by polarization arrows 20. The adjacent magnets 19 in adjacent teeth 15 are oppositely polarized as shown by head arrow symbols 20a and 20b. The arrow symbols also identify the flux direction generated within and from the magnet 19, and show the opposite direction of the flux in adjacent magnets.

In accordance with the present invention, each of the magnetic units 18 further includes a conductive magnetic member, shown as a metal shim 21. The shim 21 is a suitable magnetic steel. In the illustrated embodiment of the invention, the shim 21 is located beneath the magnet 19 within the innermost portion of the magnet opening 17. The conductive magnetic member 21 thus encounters a changing flux created by the alternating current in the stator. As is more fully developed hereinafter, this flux interacts with the fluxes of the magnetic unit 18 to essentially eliminate multiple zero crossover within the period of the fundamental frequency.

In the illustrated embodiment, each opening 17 is located completely within a tooth. The side walls 22 and 23, outer walls 24, and the inner wall 25, which define the inner end of the adjacent air gaps 16, are sufficiently thin to saturate but will not completely shut down the magnetic flux. As a result, the desired magnetic flux field for optimal interaction with the stator winding 7 is created.

In the illustrated embodiment, the magnetic rotor core 10 housing the magnetic units 18 is a laminated core and consisting of a plurality of thin, abutting core laminations 27. The core laminations 22 are formed with the individual openings and as assembled define the axially extended opening in each of the teeth.

As most clearly shown in FIGS. 2 and 3, the teeth 28 are oriented with respect to the center radius line 23 through the core key 12. The end laminations 29 and 30 are identical to the core laminations 27.

The illustrated laminations are formed with five equidistributed clamping openings 31, which are aligned with each other in the final assembly of the stacked laminations to form the core 2 with the openings for magnetic units 18 in place between the end laminations 29 and 30. Suitable attachment pin-like members, shown as rivets 32, extend through each of the elongated core openings and securely clamp the laminations in tight abutting relationship to form core 10, in accordance with more or less conventional construction. Any other securement system may of course be provided for a laminated core.

The rivet opening 31 aligned with core key 12 is circumferentially offset from the radius line 28 to the center of the core key 12, as shown at by radius line 33 in FIG. 3. In the assembly of the core 12, the end laminations 29 and 30 are rotated about the opening reference axis 33 through the key 12 by 180° and rotate to align the rivet openings. This reverses the orientation of the teeth 15a and 15b generally aligned with the key 12, and results in a reverse overlapping thereof with the opposite circumferential ends of the core tooth 15a. In particular, referring to FIG. 3, the tooth 15a of the core 12 is aligned with end teeth 15a and 15b of the end lamination 29 and in overlapping relationship therewith, as also shown by the alignment of the air gap 16a of the end lamination. The same orientation is maintained throughout for the remaining core and end lamination teeth. The overlapping structure provides abutment against the axial end of the magnetic units 18 to assist in the retention and axial location of the close fitting magnetic units 18.

Thus, as most clearly illustrated in FIGS. 1 and 3, the magnetic flux 20a and 20b created by the magnets 19 pass in a substantially linear path through the magnets 19 and the abutting shims 21. The flux path is completed through the magnetic rotor core 12, and the windings 7 and magnetic stator core 5 of the stator 2. The rotating rotor and related flux passing through the stator core 10 and windings 7 generates an output voltage and current in the winding. The current in the winding, in turn, creates a magnetic field, which is coupled to and passes through the magnets and the shims. The varying flux through each shim 21 generates eddy currents therein and creates opposing flux, which in essence functions to filter the harmonic component in the total flux wave in the system. The shims 21 thus basically function as a filter for the harmonic components and provides an essentially low harmonic output voltage.

Although shown in a preferred orientation 5with the shims as an integrated part of the magnetic unit 18 and located adjacent the interface of the magnets, the shim 21 can be readily located to the opposite side of the magnet. Referring particularly to FIG. 4, an alternate embodiment is illustrated with the corresponding elements identified by corresponding primed numbers. Thus, in FIG. 4, the shim 21' is secured between the outer wall 24' of the magnetic unit opening 17' and the magnet 19'. The interaction and coupling to the total flux field again creates the necessary eddy currents and related filtering flux modification.

Figure 5A:
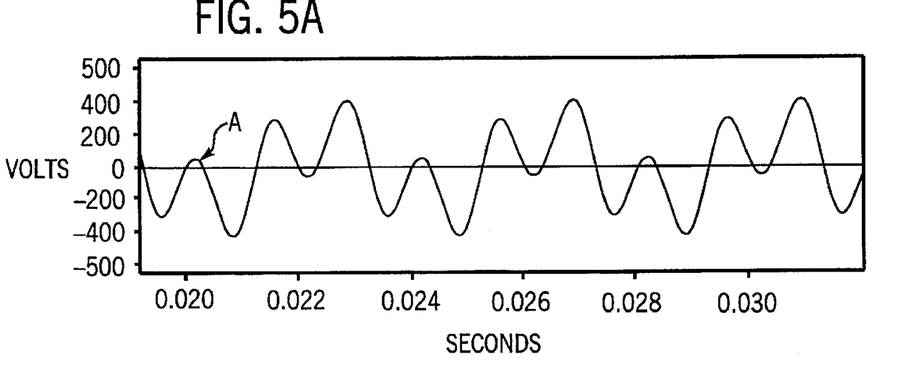
FIG. 5 is a series of voltage waveforms of a permanent magnetic generator and illustrating the result of the present invention with a rotor structure formed without a magnetic conductive shim; with a magnetic conductive shim on the inner or bottom face of the magnet and with a magnetic conductive shim on the outer or top face of the magnet.
Figure 5B:
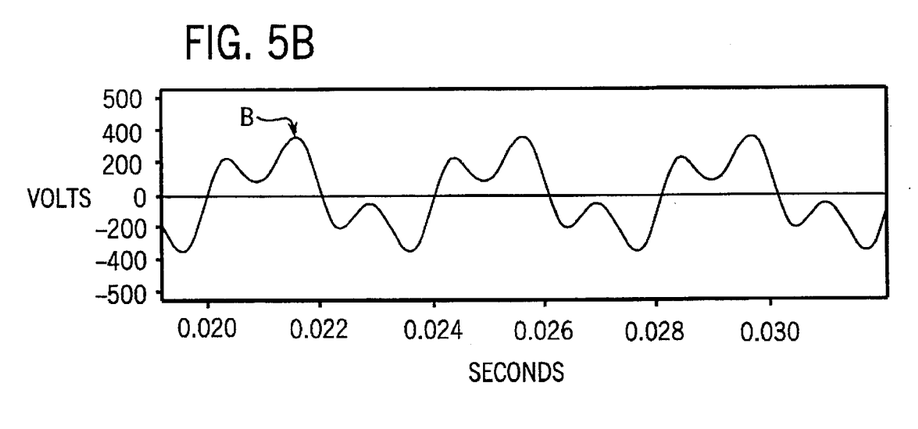
Figure 5C:
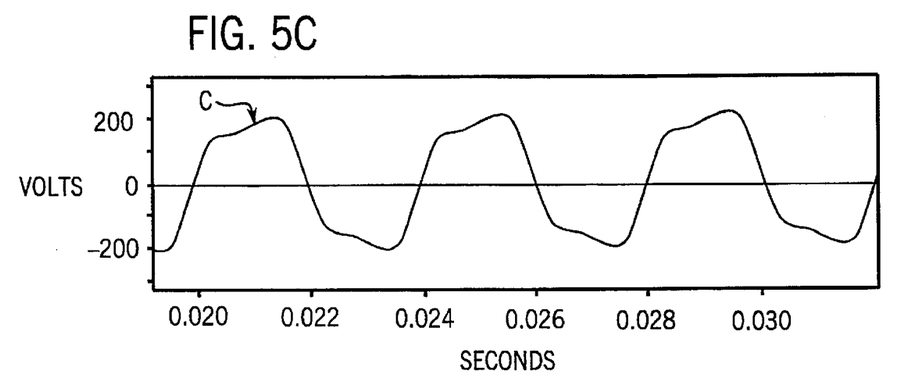
Figure 6A:
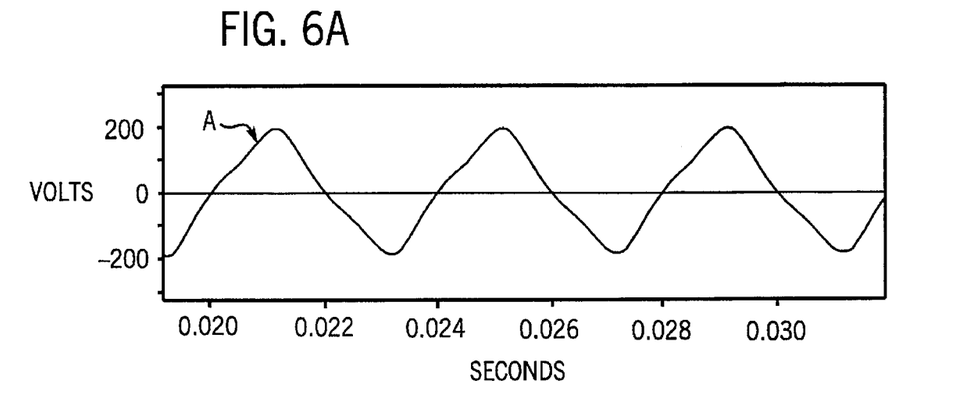
FIG. 6 is a similar set of voltage waveforms with a three ampere load on the permanent magnetic generator.
Figure 6B:
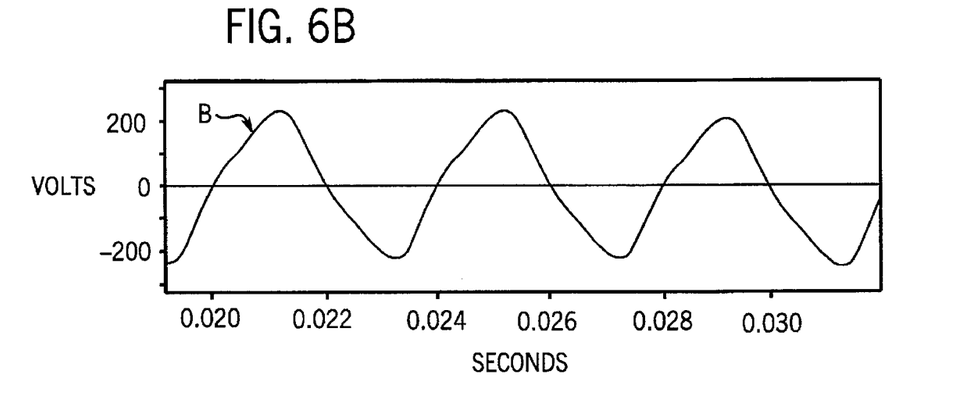
Figure 6C:
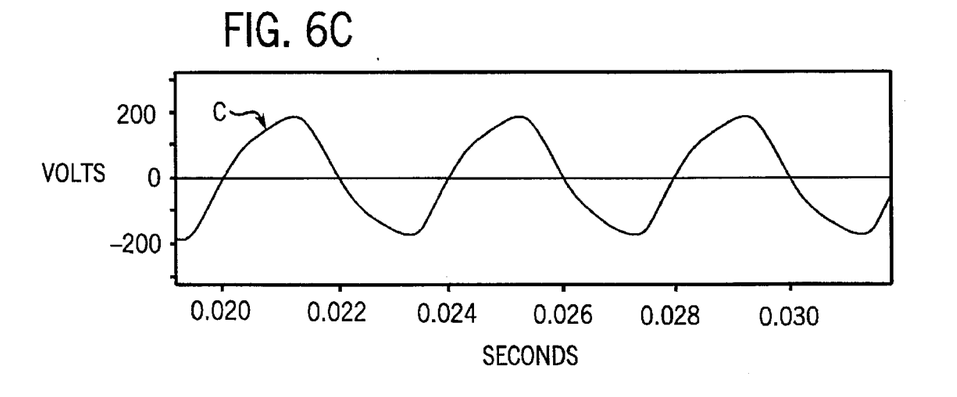

Referring to FIGS. 5 and 6, typical voltage waveforms are shown as a result of the use of the magnetic conductive shim in the magnetic units of a permanent magnetic generator. FIG. 5 is a typical voltage output with the generator, as previously described, operated at no load, and FIG. 6 illustrating the voltage output with a three amp load on the generator. FIGS. 5 and 6 particularly disclose the improvement of the voltage waveform, which more closely approaches a sine wave with the addition of the magnetic conductive shim.

Referring to FIG. 5, waveform A is the voltage output without a shim in the rotor. Waveform B illustrates the characteristic and improvement with the shim located to the inner side of the magnet and waveform C illustrates the result with the shim on the outer or top side of the magnet. The shim in both instances results in a very definitive improvement in the shape of the output waveform and illustrates the reduction in harmonic content and multiple related zero crossovers. Although the shim on the outer or top surface, as shown in waveform C, improves the overall wave shape, the voltage amplitude of the fundamental output voltage is reduced which may be considered undesirable.

FIG. 6 shows a similar set of waveforms with the three ampere load connected to the generator, and again illustrates a significant improvement in the output voltage waveform.

In both instances, the waveform more closely approaches a sine wave output voltage. Although the wave shape with the shim on top more closely approaches a sine wave, the output level is retarded.

A permanent magnet generator constructed to provide approximately substantially 1.0 kilowatt output continuously included a laminated rotor having an outside diameter of 4.57 inches and stacked to approximately a length of 1.25 inches. The shaft opening was substantially 2.71 inches. The rotor was formed with 20 uniformly spaced teeth separated by air gaps having a width at the outer peripheral surface of approximately 0.130 inches. The gaps had a U-shaped portion extending inwardly of the magnetic units by an approximately similar distance. Each tooth had a width of approximately 0.580 inches. The magnetic units were rectangular members with a length of approximately 1.13 inches and a depth of approximately 0.500 inches. The shims were of a corresponding rectangular configuration. The magnets had a thickness of approximately 1/10th of an inch and the shims had a thickness of approximately 0.025 inches. The permanent magnets material was a known material, identified as CRUMAX 3220. (CRUMAX is the trademark of Crucible Magnetics, Elizabethtown, Ky.) The central key radius through the center of the tooth 15a was offset from the rivet opening by approximately 4½ degrees. Rotation of the end laminations and alignment of the rivet openings resulted in the offset of the end lamination teeth and overlap with the two adjacent teeth thereby overlying the magnetic units within the two adjacent teeth. The above is a practical device or generator and is not limiting as to the structural arrangement other than that the magnet has a substantially greater thickness than that of the shim.

Other shimming systems can also be employed. For example, rather than having a total window, the rotor core can be formed with peripheral opening which open outwardly of the outer surface. The permanent magnet is secured within the openings which may include a wedge configuration and an outer encircling magnetic band for firmly holding of the magnets in place, generally in accordance with known constructions. Again, the shim can be placed in alignment with the outer face of the magnets. The shims and magnets may also be interconnected to each other in any desired system, and may also be assembled in other than abutting relation.

Although the magnets of the illustrated embodiment are illustrated as essentially rectangular members having planar opposed faces, other configurations including special shapes which may also provide an additional function, may be used in connection with the present invention. Thus, the critical concept is the conductive shim members in close spaced relation to the permanent magnets to filter a varying magnetic flux which at least minimizes the harmonic components in the output voltage.

In addition, the structural arrangement of the core structure of the rotor may, of course, also be varied. Thus, the separate and distinctly different end plates might be used as well as other elements provided to support the magnetic units axially or radially within the core system. The materials employed may be of any well-known or other suitable and similarly functioning materials which have similar desirable characteristics, presently known or hereinafter developed, to provide the necessary permanent magnets, the magnetic structures for the stator and rotor cores, as well as the standard core. The above and similar changes and variations can readily be provided for those skilled in the art.

Various modes of carrying out the invention are contemplated as being within the scope of the following claims particularly pointing out and distinctly claiming the subject matter which is regarded as the invention.

I claim:

1. A rotor structure for mounting within a stator to form a permanent magnet generator, said stator having windings which develop an output voltage in response to the relative rotation of the rotor within the stator, said rotor structure comprising a rotor core formed of a magnetic material, said rotor core having a plurality of circumferentially spaced permanent magnets secured to the rotor and each permanent magnet developing a radially directed magnetic flux linking with the stator windings through the rotor core, a plurality of radially spaced conductive magnetic members radially aligned one each with each permanent magnet and said permanent magnetic flux being carried by the conductive magnetic member subjected to the radially directed magnetic field established by said permanent magnets and said stator winding in response to rotation of said rotor, each said conductive magnetic member responding to said magnetic field to create eddy currents within each said conductive magnetic member and functioning to filter harmonics from the output of said magnetic field and thereby from the output of said stator winding.

2. The rotor structure of claim 1 wherein each said conductive magnetic member is secured in abutting relation to the radially inner side of each said magnet.

3. The rotor structure of claim 1 wherein said conductive magnetic member is a magnetic steel.

4. The rotor structure of claim 1 wherein said core includes a substantially rectangular opening in the outer periphery for each said permanent magnet, said magnet and said conductive magnetic member are interconnected to each other and form a magnetic unit having a substantially rectangular shape corresponding to said substantially rectangular opening and located therein in close fitted relation to the walls of said opening.

5. The rotor structure of claim 4 wherein said rotor core has an outer surface formed with a plurality of teeth each including said rectangular opening and said magnetic unit, said rotor core including a generally radially directed air gaps between each of said teeth and magnetic units with each of said teeth having sidewalls.

6. The rotor structure of claim 5 wherein the sidewalls of each of said teeth as defined by said air gaps between the teeth are relatively thin walls to the opposite sides of said magnetic unit and do not shunt completely the magnetic flux.

7. The rotor structure of claim 6 wherein each said conductive magnetic member is a magnetic steel.

8. The rotor structure of claim 5 wherein the core is formed of a plurality of like laminations including a plurality of aligned laminations between opposite end laminations, said core having a central opening for receiving a supporting shaft and said central opening having an inner keyway coupling for connection to said shaft, said teeth having a central circumferential location relative to said keyway coupling, said keyway coupling having a central location and said central location of said coupling being circumferentially offset from the central location of said central circumferential location of said teeth, said aligned laminations being secured in abutting relation between said end laminations, said end laminations corresponding in structure to said core laminations, said end laminations being rotated 180° about the center of the keyway unit and thereby overlapping adjacent core teeth to axially support said magnetic units.

9. A rotor structure for mounting within a stator to form a permanent magnet generator, said rotor structure comprising a rotor core formed of a magnetic material, said rotor core having a round peripheral portion, a plurality of permanent magnets embedded within the rotor core and developing a radial magnetic flux for linking with the stator, a plurality of conductive magnetic shims embedded within the core with one each located adjacent said magnets and in radial alignment with said magnets and thereby aligned with and carrying the magnetic flux established by the aligned said permanent magnets, said conductive magnetic shims responding to changes in the magnetic flux therein to create eddy currents within said conductive magnetic shims and further modifying the flux field in said rotor and stator.

10. The rotor structure of claim 9 wherein said conductive magnetic shims are magnetic steel.

11. The rotor structure of claim 9 wherein said magnets and said conductive magnetic skims are totally enclosed within said magnetic core including a thin outer peripheral core wall, each said conductive magnetic shim being located immediately adjacent to said magnet.

12. The rotor structure of claim 11 including air gaps in said core spaced from each side of each magnet to form thin sidewalls adjacent each magnet and adjacent conductive magnetic shim.

13. The rotor structure of claim 9 wherein said conductive magnetic shims abut an aligned magnet.

14. The rotor structure of claim 13 wherein said conductive magnetic shims abut the innermost circumferential surface of the aligned magnet.

15. A rotor structure for mounting within a stator having a stator winding to form a permanent magnet generator, said rotor structure comprising a rotor core formed of a magnetic material, a plurality of magnet units secured to the rotor, each said magnetic unit including a permanent magnet having a radial polarization and forming a magnetic flux directed radially from the rotor core for linking with the stator winding, each said magnetic unit including a conductive magnetic member radially aligned with the permanent magnet and carrying said flux directly through said conductive magnetic members.

16. A rotor structure for mounting within a stator to form a permanent magnet generator comprising a rotor core formed of a magnetic material and having an outer round surface, a plurality of rectangular magnetic units secured within said rotor core and developing a radial magnetic flux extending radially outwardly of said round surface, each of said magnetic units including a permanent magnet and a thin conductive magnetic member radially aligned with and subjected to the magnetic field established by the permanent magnet of the unit.

17. The rotor structure of claim 16 wherein said thin conductive magnetic member is a magnetic steel.

18. The rotor structure of claim 16 wherein each magnetic unit is a rectangular structure having generally radial sidewalls and generally flat circumferential walls, each said magnet being radially polarized, said conductive magnetic member abutting a flat circumferential wall of the magnet, said core having circumferentially spaced openings corresponding to said rectangular structure, and said core having radial slots between adjacent openings to form thin sidewalls for each opening.

19. The rotor structure of claim 16 wherein said magnetic conductive member abuts the permanent magnet.

20. In a permanent magnet generator having a annular stator with a winding wound on the inner periphery and having a capacitor connected in parallel with said winding for developing output voltage in response to rotation of a rotor therein, said rotor comprising:

a rotor core of a magnetic material, a plurality of circumferentially spaced and axially elongated openings in the outer peripheral portion of said core, air gaps located between the circumferentially spaced openings and with sidewalls between the air gaps and the openings, a plurality of permanent magnetic units located one each in each of said openings, each of said permanent magnetic units including a permanent magnet and an abutting magnetic conductive member abutting a radially located surface of said permanent magnetic, said permanent magnet being radially polarized and establishing a permanent magnetic field coupled to said stator winding and developing with said stator winding a radial magnetic field passing through the permanent magnet and said conductive magnetic member, said field creating eddy currents within said conductive magnetic members and thereby creating a further magnetic flux for canceling of harmonics from the total magnetic field of the stator and rotor and thereby producing a fundamental output voltage with reduced harmonic content.

21. In the permanent magnet generator of claim 20 wherein each said conductive magnetic member is a magnetic steel.

22. In the permanent magnet generator of claim 18 wherein said conductive magnetic member abuts the radially inner surface of the permanent magnet.

23. In the permanent magnet generator of claim 16 wherein each of said magnetic units is an elongated rectangular unit.

24. In the permanent magnet generator of claim 20 wherein each magnetic unit is a rectangular structure having generally radial sidewalls and generally flat circumferential walls, each said magnet being radially polarized, said conductive magnetic member abutting a flat circumferential wall of the magnet, said core having circumferentially spaced openings corresponding to said rectangular structure, and said sidewalls of said openings being thin sidewalls for preventing complete shunt of the magnetic flux.

25. In the permanent magnet generator of claim 22 wherein said conductive magnetic member abuts the radially inner surface of the permanent magnet.

* * * * *

UNITED STATES PATENT AND TRADEMARK OFFICE
CERTIFICATE OF CORRECTION

PATENT NO. : 5,650,680
DATED : July 22, 1997
INVENTOR(S) : STANLEY S. CHULA It is certified that error appears in the above-identified patent and that said Letters Patent is hereby corrected as shown below:

Claim 11, column 7, line 53 delete "skims" and substitute therefore ---shims---; Claim 15, column 8, line 2 delete "magnet" and substitute therefore ---magnetic---; Claim 20, column 8, line 47 delete "magnetic" and substitute therefore ---magnet---

Signed and Sealed this

Seventeenth Day of March, 1998

*Attest:*

BRUCE LEHMAN

*Attesting Officer*  Commissioner of Patents and Trademarks